United States Patent [19]
Tashiro et al.

[11] Patent Number: 4,628,434
[45] Date of Patent: Dec. 9, 1986

[54] FACILITIES CONTROL METHOD

[75] Inventors: Tsutomu Tashiro, Sagamihara; Koichi Haruna, Yokohama; Norihisa Komoda, Kawasaki, all of Japan

[73] Assignee: Hitachi, Ltd., Tokyo, Japan

[21] Appl. No.: 608,164

[22] Filed: May 8, 1984

[30] Foreign Application Priority Data

May 9, 1983 [JP] Japan ................... 58-79341

[51] Int. Cl.$^4$ ................... G06F 15/18; G06F 15/46
[52] U.S. Cl. ................... 364/130; 364/140; 364/148; 364/300; 364/402; 364/900
[58] Field of Search ............. 364/130, 140, 141, 148, 364/152, 300, 402, 200 MS File, 900 MS File

[56] References Cited

U.S. PATENT DOCUMENTS

| | | | |
|---|---|---|---|
| 3,460,096 | 8/1969 | Barron | 364/152 X |
| 3,715,730 | 2/1973 | Smith et al. | 364/200 |
| 3,716,840 | 2/1973 | Masten et al. | 364/200 |
| 3,725,875 | 4/1973 | Choate et al. | 364/200 |
| 4,210,962 | 7/1980 | Marsh et al. | 364/402 |
| 4,368,509 | 1/1983 | Li | 364/148 |

Primary Examiner—Joseph Ruggiero
Attorney, Agent, or Firm—Antonelli, Terry & Wands

[57] ABSTRACT

A control system employs a controller for controlling the operation of a plurality of facilities and a memory which stores information employed by the controller for controlling the operation of the facilities. The memory includes a first portion for storing facility status signals and command signals, a second portion which stores a series of rules which are triggered in response to status information from the respective facilities, a portion which converts the rules into internal codes, and a portion which stores the results of the application of the internal codes to control commands. The controller monitors facility status signals and controls the generation of facility status signals. It also controls which rule set number is to be used in accordance with information stored in memory and contains an internal code generator for generating the internal codes corresponding to generated facility status signals. The controller reads out rules from memory based upon the rule sets being employed and generates control command signals in accordance with data stored in memory. From these signals, command signals are generated for controlling the operation of the facilities.

2 Claims, 26 Drawing Figures

| FORM | IF PART | THEN PART |
|---|---|---|
| 1 | IF (······⟨CONSTANT⟩······⟨CONSTANT⟩······) ∼ | THEN (······⟨CONSTANT⟩······) ∼ |
| 2 | IF (······⟨VARIABLE⟩······⟨CONSTANT⟩······) ∼ | THEN (······⟨VARIABLE⟩······⟨VARIABLE⟩······) ∼ |
| 3 | IF (······⟨VARIABLE⟩······⟨VARIABLE⟩······) ∼ | THEN ⟨PROCEDURE NAME⟩ (······⟨VARIABLE⟩······) ∼ |

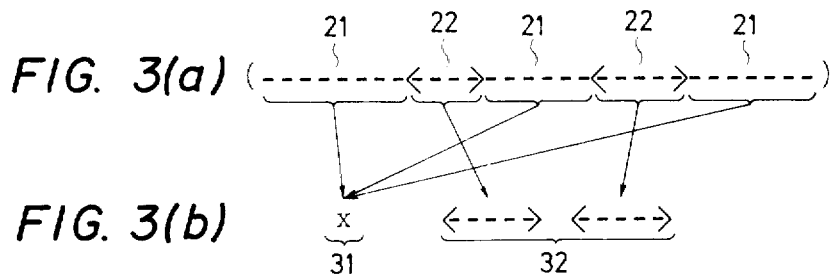
FIG. 3(a)
FIG. 3(b)
FIG. 4
| NUMBER | RULE |
|---|---|
| No.1 | IF    1 <X><br>THEN  2 <X> |
| No.2 | IF    2 <X><br>IF    3 <Z><br>IF    4 <X> <Y><br>IF    5 <Z> <Y><br>THEN  6 <Z> <X> |
| No.3 | IF    6 <Z> <X><br>THEN <minz> 7 <Z> |
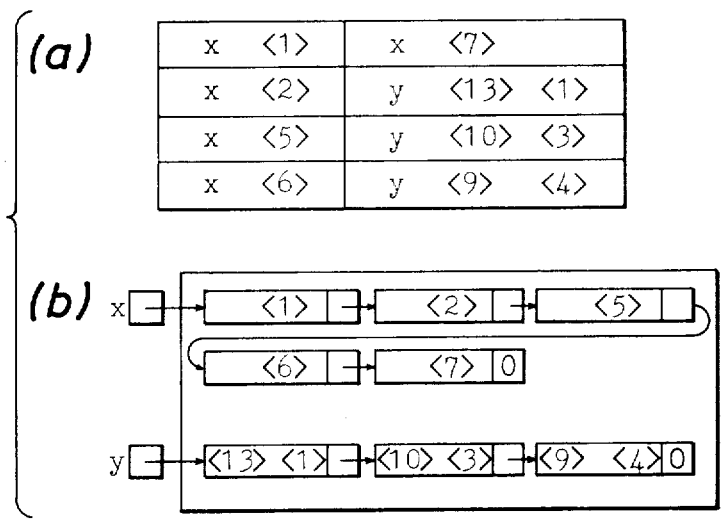
FIG. 5A

| ENTRY OF STATUS SIGNAL LINE | NUMERICAL CODE | PARAMETER PART |
|---|---|---|
| ADDRESS A | 1 | X |
| ADDRESS B | 8 | 1 |

| ENTRY TO COMMAND SIGNAL LINE | NUMERICAL CODE | PARAMETER PART |
|---|---|---|
| ADDRESS C | 9 | 1 X Z |
| ADDRESS D | 10 | <1><ASSEM-BLING A> |

| ENTRY OF STATUS SIGNAL LINE | |
|---|---|
| ADDRESS A | 1 |
| ADDRESS E | 2 |

| 1 |
|---|

| | HEAD POSITION OF RULE SETS | THE LAST POSITION OF RULE SETS |
|---|---|---|
| No.1 | 1 | 4 |
| No.2 | 5 | 7 |

91

(b)

| RULE TYPE | IF PART | | THEN PART | | |
| | NUMERICAL CODE | PARAMETER PART | PROCEDURE NAME | NUMERICAL CODE | PARAMETER PART |
|---|---|---|---|---|---|
| 0 | 1 | ⟨X⟩ | | 2 | ⟨X⟩ |
| 0 | 6 | ⟨Z⟩⟨X⟩ | ⟨minz⟩ | 7 | ⟨Z⟩ |
| | 8 | ⟨1⟩ | | 9 | ⟨1⟩⟨X⟩⟨Z⟩ |
| | 7 | ⟨Z⟩ | | 10 | ⟨Z⟩⟨Y⟩ |
| 1 | 2 | ⟨X⟩ | | | |
| | 4 | ⟨X⟩⟨Y⟩ | | | |

92

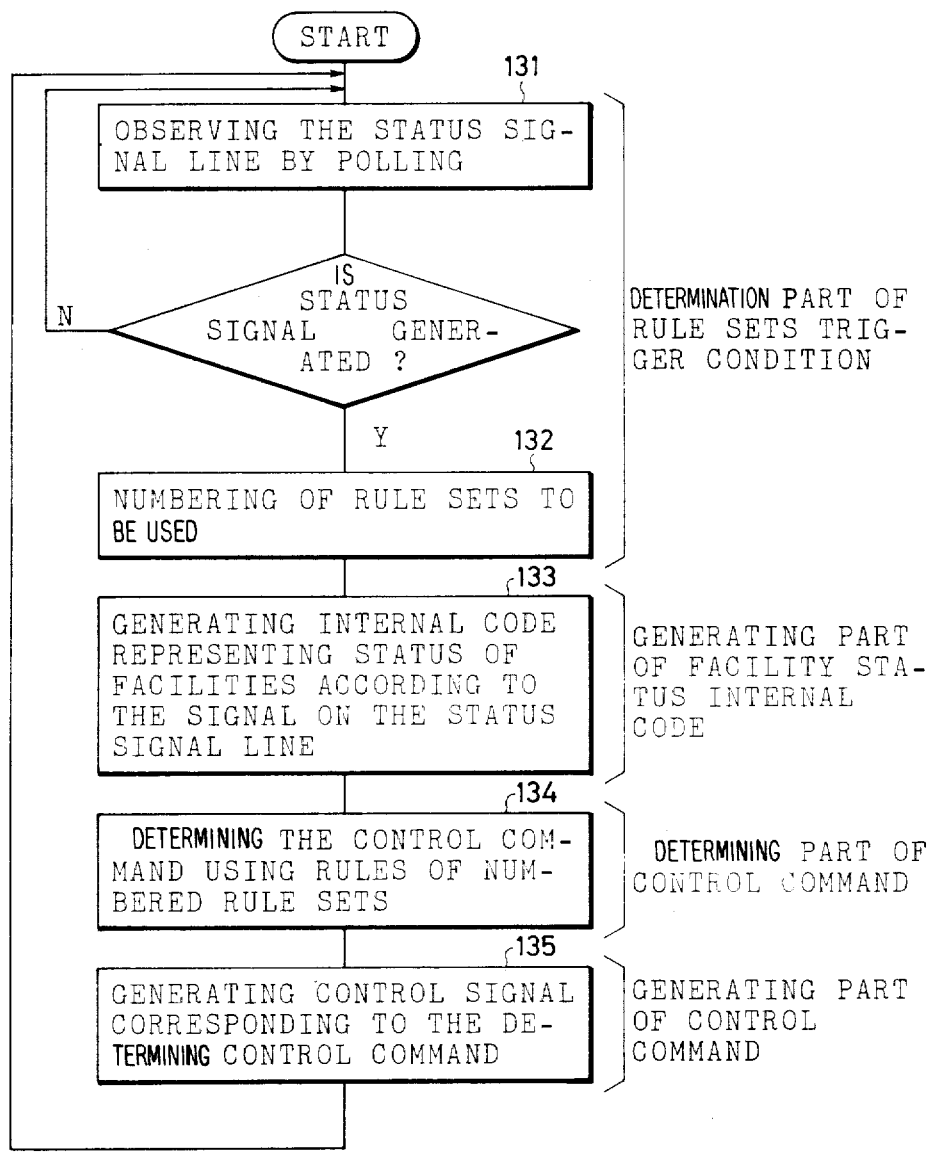

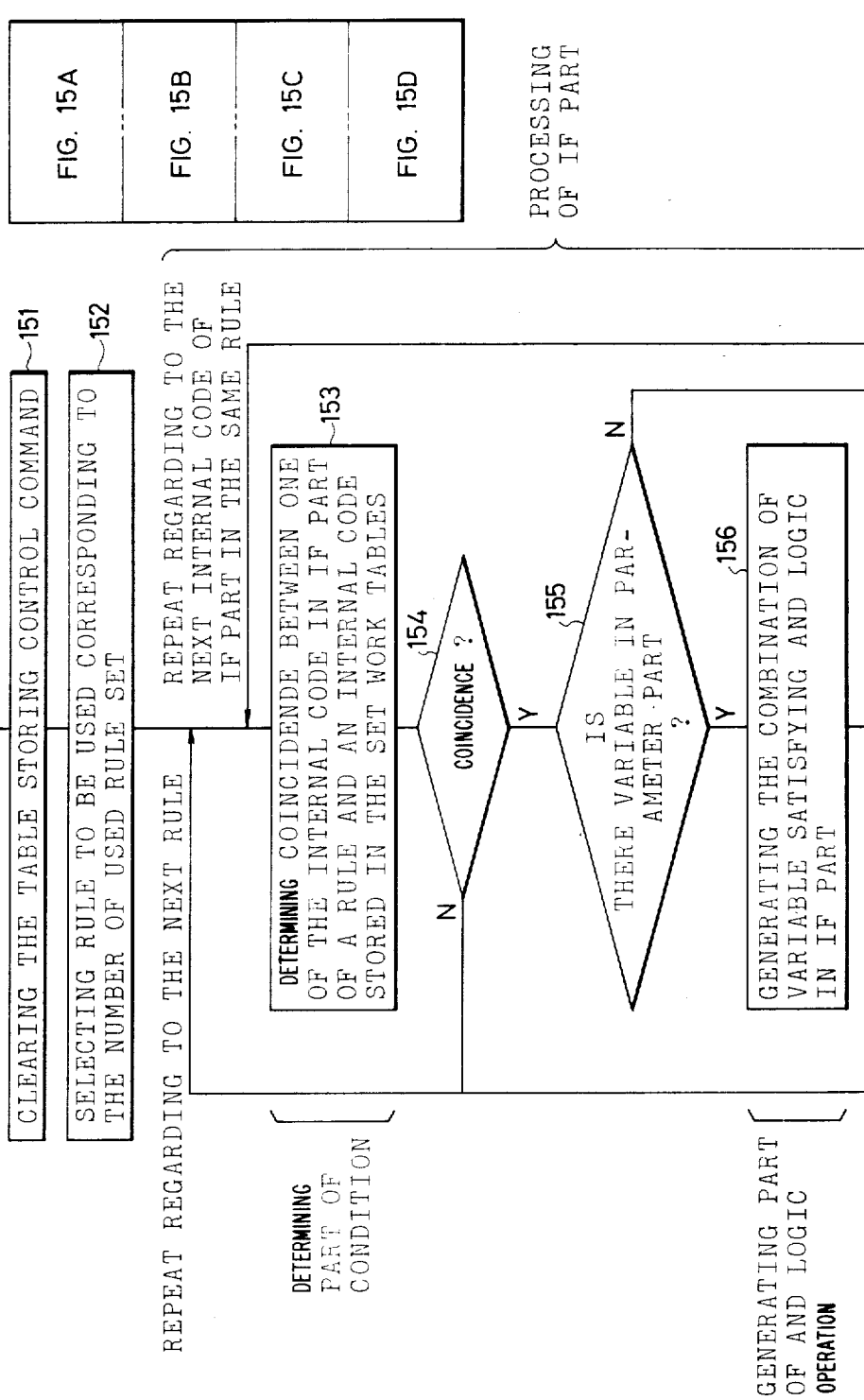

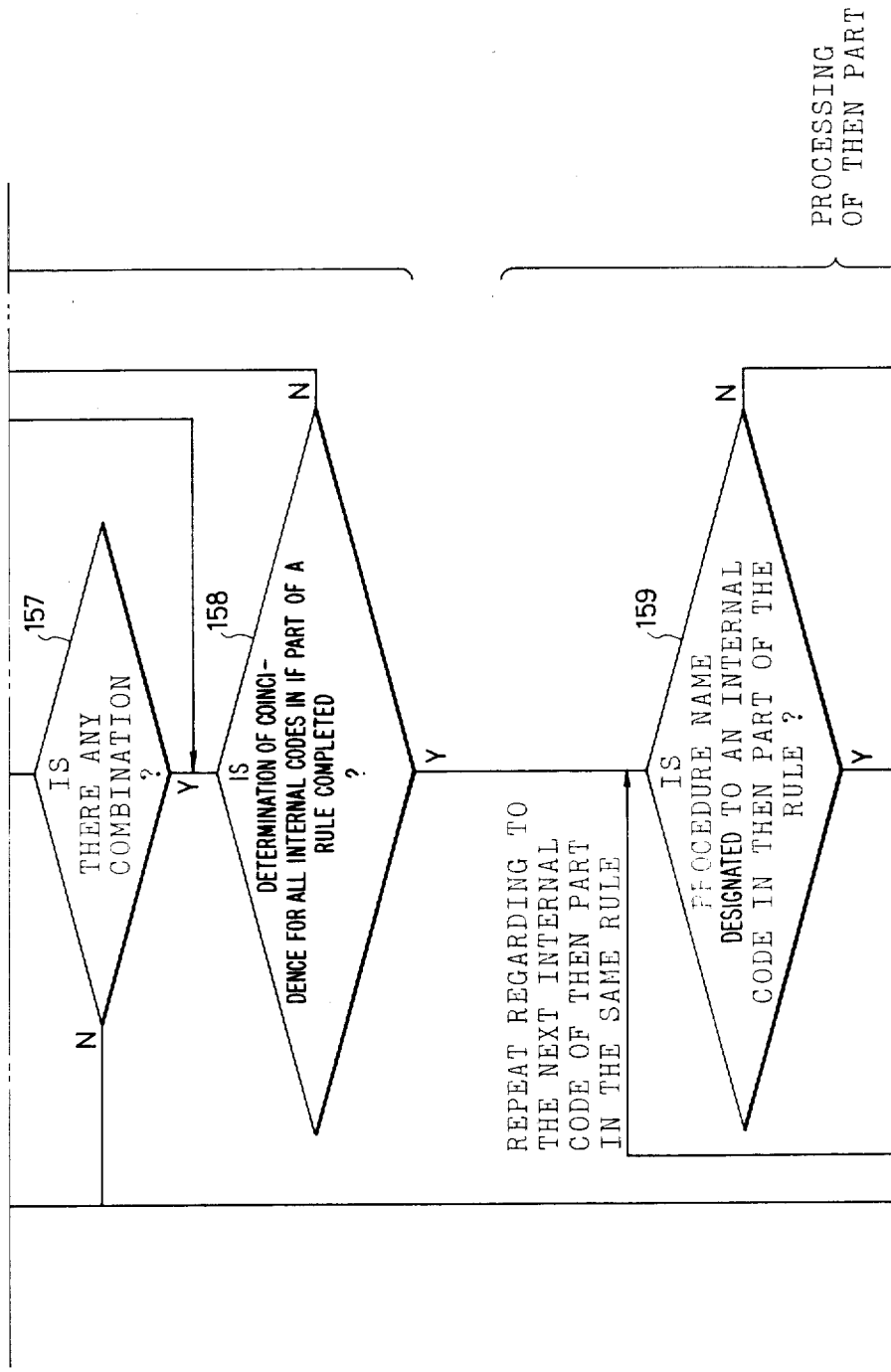

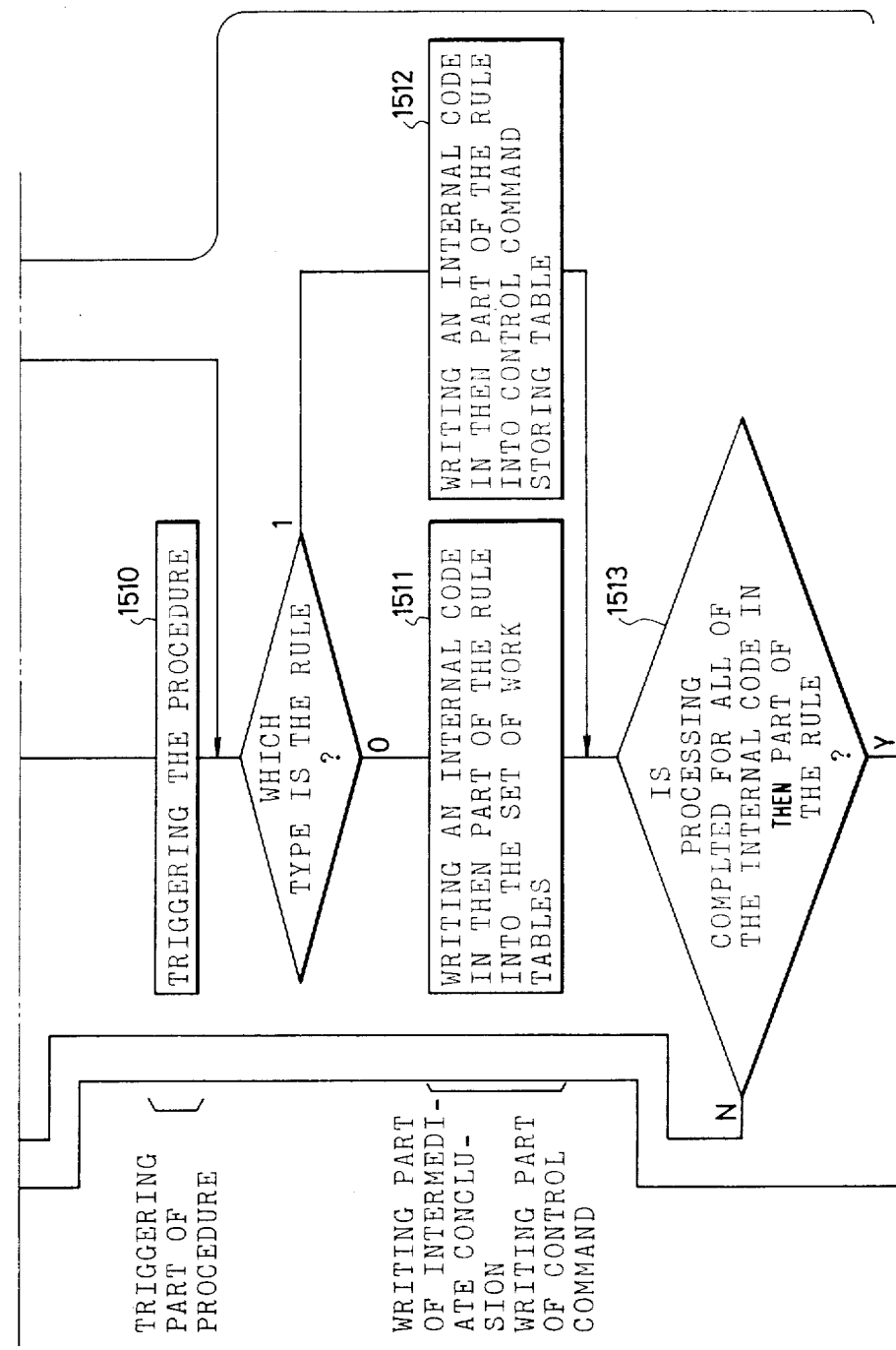

FACILITIES CONTROL METHOD

BACKGROUND OF THE INVENTION

The present invention relates to a facilities control method. More particularly, it relates to a facilities control method performing condition discriminative control in which the status of each of a plurality of facilities in an automated factory or the like is stored in a computer, conditions are determined in accordance with predetermined control logic operations, and when the conditions have been satisfied, control commands specified by the control logic operations are issued to the respective facilities.

DESCRIPTION OF THE PRIOR ART

In an FA (Factory Automation) system, it is desirable that variations in manufacturing process facilities associated with a change in the quantity of articles to be produced or a change in the product kind itself be done simply and rapidly.

Applicants have described, in copending patent application Ser. No. 578,676, filed Feb. 9, 1984, for "Facilities Control Method" and assigned to the Assignee of the present application, a scheme for enhancing the performance and alterations of a facilities control system. Since this method processes character strings by storing them in a work table as is, processing is simple. However, the processing time is too long, and the method has had the disadvantage of being unusable for a controlled system which requires a short response time.

In accordance with the above method, control logic operations are implemented as a plurality of condition - conclusion pairs called IF - THEN rules, each of which consists of a conditional part (IF part), descriptive of a condition to be examined and a conclusion part (THEN part) descriptive of a task to be executed or a condition to be assumed when the conditional part is satisfied. This method affords these of performance of condition discriminative control for such reasons (i) that the IF - THEN rules can be assembled using any desired character strings, or in Japanese, and (ii) that merely by itemizing the condition - conclusion pairs by the IF - THEN rules, the tasks to be executed can be determined automatically by applying the conclusion of any rule to the condition evaluation of another rule.

In order to realize the items (i) and (ii), the above-referenced facilites control method adopts a method in which the task to be finally executed is determined by repeating the processing steps of first converting the status of each of the facilities into a character string which is stored in a work table, subsequently examining the condition of the IF part of the rule by comparing the character string of the IF part with a character string in the work table, and writing a character string of the THEN part as the conclusion into the work table anew when the condition is satisfied.

This method is simple in terms of its processing steps, but it involves the problems stated below:

(i) Since pattern matching is performed using the entire character string, as is, processing time is lengthy.

(ii) In determining the coincidence of the character string of the IF part and writing the character string of the THEN part, all the character strings stored in a character string storing table are checked, so that a large number of useless pattern matching operations are performed.

For these reasons, in the above method, considerable processing time is needed from the reception of the status of each of the facilites until the generation of control commands. It has, accordingly, been impossible to apply the above method to a controlled system in which a short response time is required.

SUMMARY OF THE INVENTION

An object of the present invention is to solve such problems, and to provide a facilities control method which can easily perform a condition discriminative control operation and which is applicable even to the control of a controlled system requiring a short response time.

In order to accomplish this object, the present invention provides a facilities control method having a rule memory part which stores information representative of rules consisting of conditions and actions to be taken with respect to facilities, a status memory part which stores information representative of the status of each of the facilities, a job (or task) to be executed and results of applying the rules to status information, and a rule applying part which compares the information stored in the status memory part and the conditions stored in rule memory part and which stores the conclusions reached from the application of the rules, conditions of which have been satisfied into the status memory part, thereby determine control commands for the facilities. It is further characterized in that information items which represent the statuses of the facilities, the tasks to be executed by the facilities and the results of application of the rules are expressed as encoded information, that they are coupled by pointers for the same codes and thus stored in the status memory part, and that the rule applying part performs comparison processing by tracing the pointers.

BRIEF DESCRIPTION OF THE DRAWINGS

FIG. 3 is an explanatory diagram of a method of converting a character string into an internal code, illustrative of the principle of the present invention;

FIG. 4 is a diagram showing examples of IF - THEN rules converted into internal codes by the method of FIG. 3;

FIGS. 5A and 5B are diagrams for explaining a case where internal codes in FIG. 1 are stored in a work table by the method of the present invention;

FIG. 7 is a detailed diagram of an input/output signal versus internal code information memory part;

FIG. 8 is a detailed diagram of an IF - THEN rule trigger event memory part;

FIG. 9 is a detailed diagram of an IF - THEN rule memory part;

FIG. 13 is an operating flow chart of the control part;

FIG. 15, including FIGS. 15A, 15B, 15C and 15D, is an operating flow chart of the control command deciding part;

DETAILED DESCRIPTION OF THE PREFERRED EMBODIMENTS

For the sake of comparisons with the present invention, the control command deciding method based on the foregoing facilities control method will be first described with reference to FIG. 1.

Figure 1:
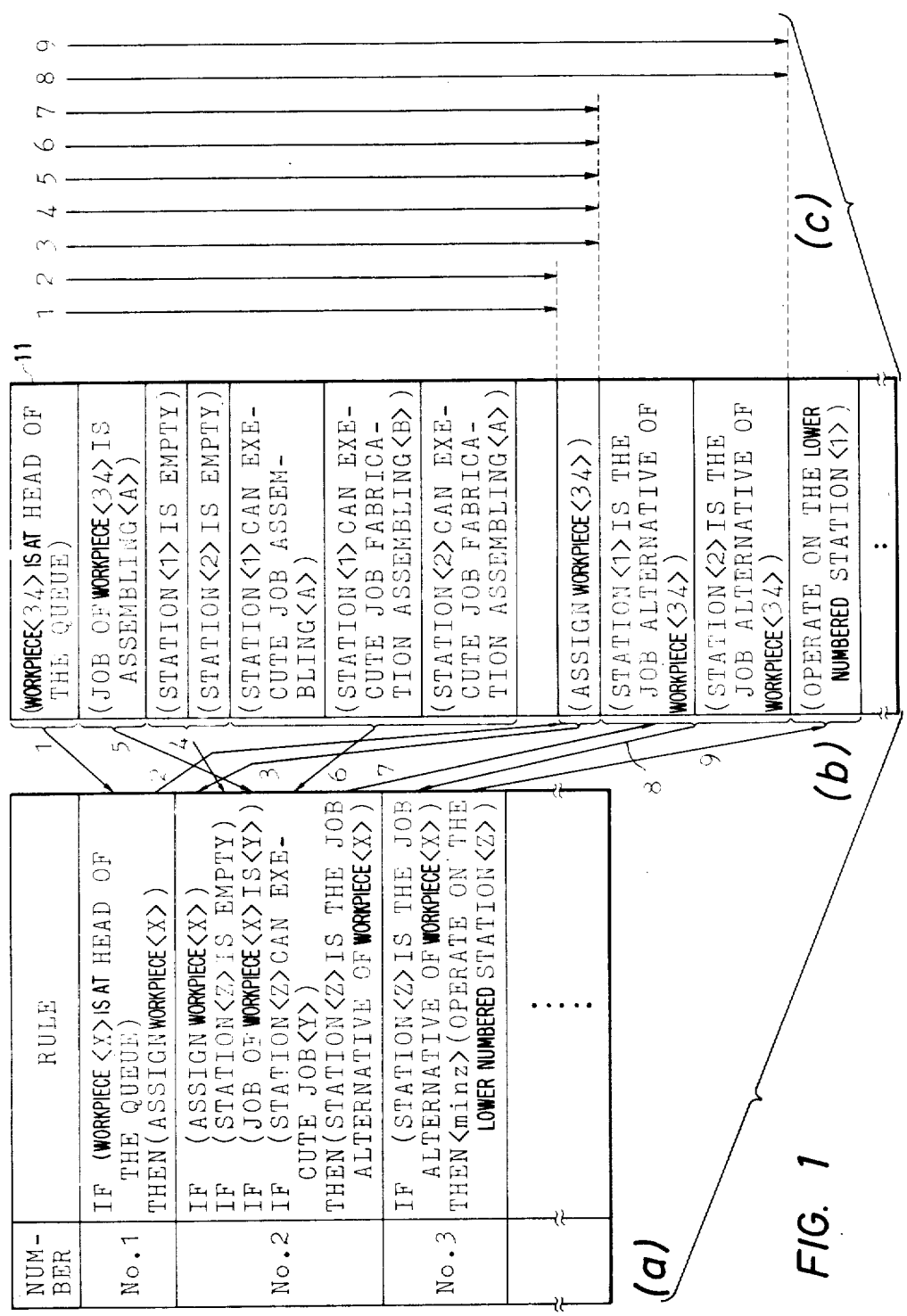
FIG. 1 is an explanatory diagram of a control command deciding system previously proposed.

In FIG. 1, part (a) shows some of the rules for assigning tasks to work stations of an automated factory, part (b) is a character string storing table, and part (c) illustrates the search ranges of the table.

IF - THEN rules include three types, the processing methods of which are respectively different. These will be described later.

First, the status of each of the facilities is written into the character string storing table 11 (from work <34> is the head of a queue) through (carrier <1> is empty)). Next, a pattern matching (comparison) operation between (work <X> is the head of a queue) which is the character string of the IF part of rule number 1 and character strings in the character string storing table 11 is performed (arrow 1)). This matching step is performed with respect to those parts of the character strings other than those enclosed with < >. In this step, all the character strings stored in the character string storing table 11 are checked for the presence of a match. As indicated by arrow 1 in part (c) of FIG. 1, the search range of the table for this step extends through (carrier <1> is empty). The reason for checking all the charcter strings is that a plurality of the same type of character strings might be written in the table 11. That is, character strings in which characters except the parts enclosed with < > are the same, for example, (station <1> is empty) and (station <2> is empty) are the same types of character strings.

In FIG. 1, rule number 1 has a coincident character string in the character string storing table 11 so that the condition of the IF part thereof is satisfied. Therefore, a character string (assign work <34> which corresponds to the character string of the THEN part representative of a conclusion is rewritten into the character string storing table 11 (arrow 2).

In order to prevent the same conclusion from being written into a plurality of areas of the character string storing table, the conclusion is not written until after it has been determined, over a search range 2 in part (c), that the same conclusion is not included in the character strings already present within the character string storing table 11. Regarding rule numbers 2 and 3, the same processing step is repeated, to successively store the conclusions of THEN parts into the character string storing table 11. Since rule number 2 includes a plurality of IF's, the conclusion of the THEN part is supplementarily written upon acknowledging that the result of an AND logic operation on them is true.

Now, a method of an encoding a character string and a method of storing encoded information on the basis of pointer coupling will be described in order to explain the present invention.

Figures 2A, 2B:
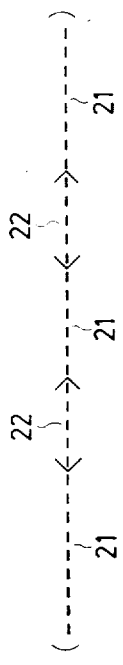
FIG. 2 is an explanatory diagram of the forms of IF - THEN rules.

Parts (a) and (b) in FIG. 2 are diagrams showing the format of a character string of an IF - THEN rule and the forms of IF - THEN rules, respectively.

As shown at part (a) of FIG. 2, a character string, which expresses a condition and a conclusion to be described for an IF - THEN rule, is denoted as a character string enclosed by ( ). The character string is formed of fixed parts 21 which are fixedly handled, and parameter parts 22 which are handled as constants or variables. Each parameter part 22 is enclosed by < >. As shown in part (b) of FIG. 2, the IF part of the rule assigns, after IF, a character string of the format illustrated in part (a) of FIG. 2. For specifying a plurality of conditions, a plurality of IF (character string)'s are written in succession. The plurality of specified conditions are handled as an AND logic operation. In part (b) of FIG. 2, ... denotes any desired character string, and ∫ signifies that a plurality of strings can be specified.

The THEN part of the rule assigns after THEN a character string of the format illustrated in part (a) of FIG. 2. In the IF - THEN rule indicated as Form 3 in part (b) of FIG. 2, a character string is assigned following a procedure named after THEN. For describing a plurality of conclusions, a plurality of THEN (character string)'s are written in succession.

IF - THEN rules include three forms shown in part (b) of FIG. 2, as follows:

(i) Rule of Form 1: Rule in which only constants of facility numbers, job names, etc. are described in parameter parts. In this form, the pattern matching with a character string in the work table is performed in all the parts (both the fixed and parameter parts) of the character string of the IF part. A character string to be supplementarily written in the work table is a character string as assigned in the THEN part.

(ii) Rule of Form 2: Rule which includes variables (W, X, Y, Z, etc.) in parameter parts. A parameter part may be a constant. In this form, pattern matching with a character string in the work table is performed in those parts in the character string of the IF part which are other than the parameter parts specifying the variables. Next, in all the matched character strings within the work table, the contents of parameter parts corresponding to the parameter parts specifying the variables in the character string of the IF part are temporarily stored as variables. A character string to be supplementarily written in the work table is such that the parameter parts specifying the variables in the character string of the THEN part are replaced with only those stored variable values which satisfy an AND logic operation as the plurality of conditions of the IF part.

(iii) Rule of Form 3: Rule in which, in addition to the rule of Form 2, a procedure name is specified and enclosed with < > between the THEN and character string of the THEN part. Basically, the rule of this form is subjected to the same processing operation as that of the rule of Form 2. In the rule of this form, immediately before the character string of the THEN part thereon supplementarily written in the work table control shifts to the specified procedure. In this case, the variable value which satisfies an AND logic operation is the plurality of conditions of the IF part is delivered as a subtrahend. In this procedure, a processing operation such as maximum value selection and a numerical value operation, is performed, and control can be returned by changing the delivered variable. A character string to be supplementarily written in the work table is such that the variable value changed by the procedure is incorporated in the corresponding parameter part of the THEN part.

FIG. 3 is an explanatory diagram of a method of converting a character string into an internal code.

In the character string which is assigned in the IF part or the THEN part of the IF - THEN rule shown in FIG. 2, and in the character string which is stored in the work table, the fixed part 21 is used for separating one character string from another. In contrast, as to the parameter part 22, the content itself becomes information for determining the operating command of the facility. For these reasons, an internal code is formed by a method which the information items of the parameter parts 22 of the character string are handled as is, and the fixed parts 21 are caused to correspond to one numerical value.

Part (a) in FIG. 3 shows the format of the original character string, while part (b) in FIG. 3 shows the format of the internal code . . . indicates any desired characters, 31 a numerical code, and 32 a parameter part.

In FIG. 3, first of all, the fixed parts 21 of the original character string are extracted, and one numerical code 31 is caused to correspond to each character string pattern. Accordingly, when the character string patterns of the fixed parts 21 are the same, the same numerical code 31 is used. Next, following the numerical code 31, the parameter parts 22 of the original characters string are arranged in the order of occurrence. These are called parameter parts 32. As a result of such an internal code forming method, in comparing the patterns it is only necessary to determine coincidence of the parameter part 32 as to the character string of the same numerical code 31, which can shorten processing time as compared with the case of determining coincidence of the entire character string as in FIG. 1.

FIG. 4 is a diagram showing examples of IF - THEN rules converted into internal codes.

In FIG. 4, examples of internal codes of the IF - THEN rules in part (a) of FIG. 1 are depicted. Here, (workpiece is at the head of queue) is encoded into numerical code 1, (assign workpiece) is encoded into numerical code 2, (station is empty) is encoded into numerical code 3, (job task) is encoded into numerical code 4, (station is usable) is encoded into numerical code 5, (station is the job alternative) is encoded into numerical code 6, and (operate on the lower number station) is encoded into numerical code 7.

Figure 5B:
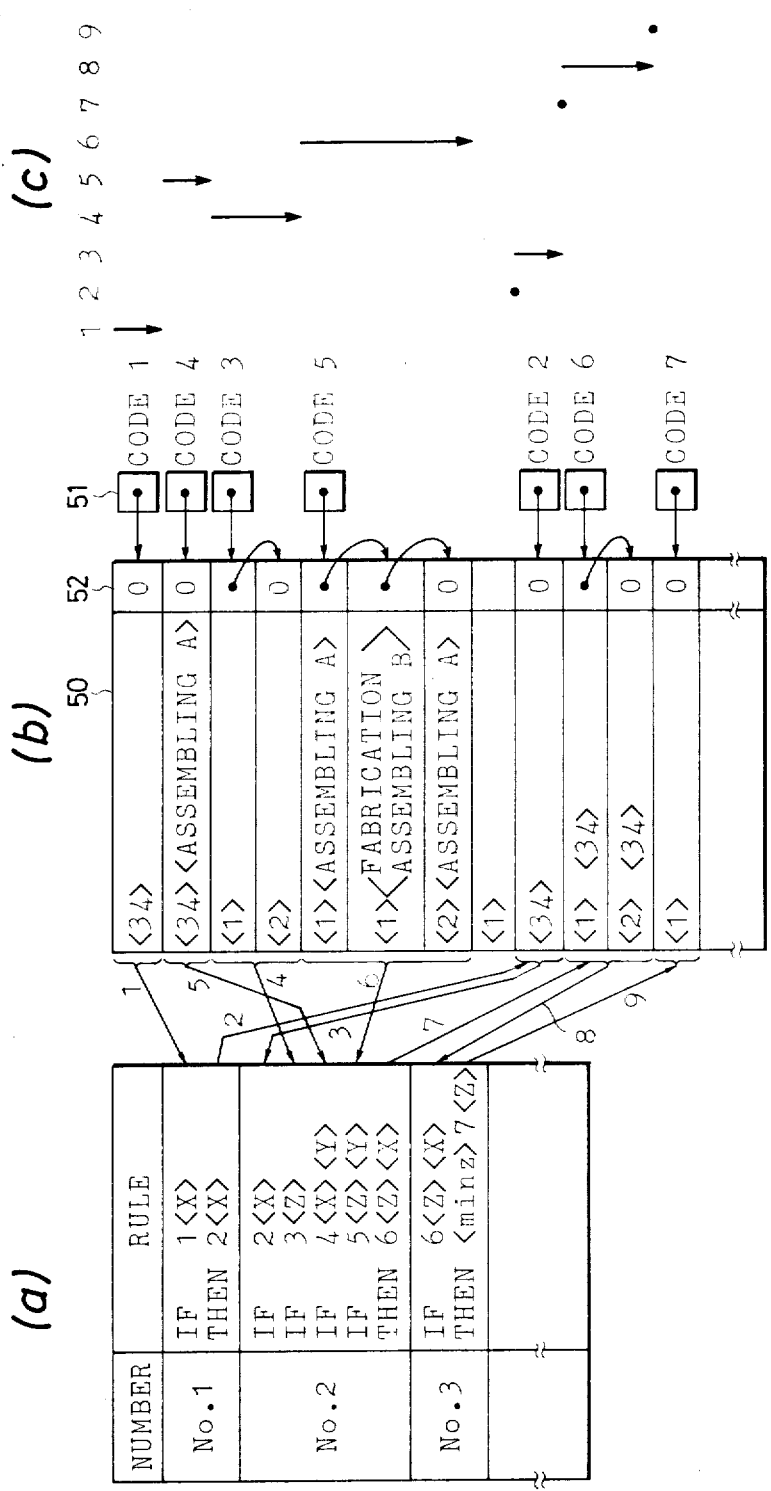

FIG. 5A is an explanatory diagram illustrative of a method of storing the internal codes in a work table or a method of storing encoded information in the basis of pointer coupling. In addition, FIG. 5B is a diagram showing the pattern matching method and check ranges of the work table in correspondence with FIG. 1.

As shown in FIG. 5A, in the present system, only the parameter parts 32 in the encoded information are extracted and are stored in the work table 50 of FIG. 5B. In part (a) of FIG. 5A, the internal code information items of the rules shown in FIG. 4 are extracted and arranged. The numerical code portions of the internal codes of the IF parts are denoted by x, while the numerical code portions of the internal codes of the THEN parts are denoted by y.

As shown in part (b) of FIG. 5A, only the parameter parts 32 of the internal codes in part (a) of FIG. 5A except the numeric codes x and y are stored in the work table 50 of FIG. 5B. In this case, the parameter parts 32 having the same numerical codes are coupled by pointers 51 and 52 of FIG. 5B and then stored in such a manner that which ones of the numerical codes x and y function to which the stored parameter parts 32 correspond can be distinguished. That is, the head pointer 51 is provided for each of the different numerical codes x and y, and the corresponding parameter parts 32 are stored ahead of the pointer 51. The parameter parts 32 having the same numerical codes are stored in the state in which they are coupled by the continuing pointers 52. The last of the continuing parameter parts 32 is indicated by the fact that the value of the continuing pointer 52 is "0".

With this method, in processing the coincidence between the coded information of the IF part of the IF - THEN rule and the work table information, namely, matching the IF, it is possible to first trace the head pointer 51 corresponding to the numerical code (x, y) specified in the IF part and to sequentially process the parameter parts 32 stored in the work table 50.

Accordingly, in FIG. 1, the processing search is conducted from the top of the work table 50, whereas in FIG. 5B, all useless checks can be omitted. As is apparent by comparing part (c) of FIG. 1 and part (c) of FIG. 5B, the search range of the table 50 is much smaller in the latter than in the former. Likewise, as to the checks of the existence of the same information in the case of supplementarily writing the coded information of the THEN part into the work table 50, only minimum checks are required, so that the pointers 52 are sequentially followed from the head pointer 51 which corresponds to the numerical code specified in the THEN part.

The present invention realizes a condition discriminative control on the basis of FIGS. 5A and 5B. It has the function of converting the status of each of the facilities into an internal code and storing these codes in the work table in accordance with the foregoing method. It also determines control commands so the basis of rules converted into internal codes and information coupled by pointers and stored in the work table, and converts determined control commands into signals and sends the signals to respective facilities.

Figure 6:
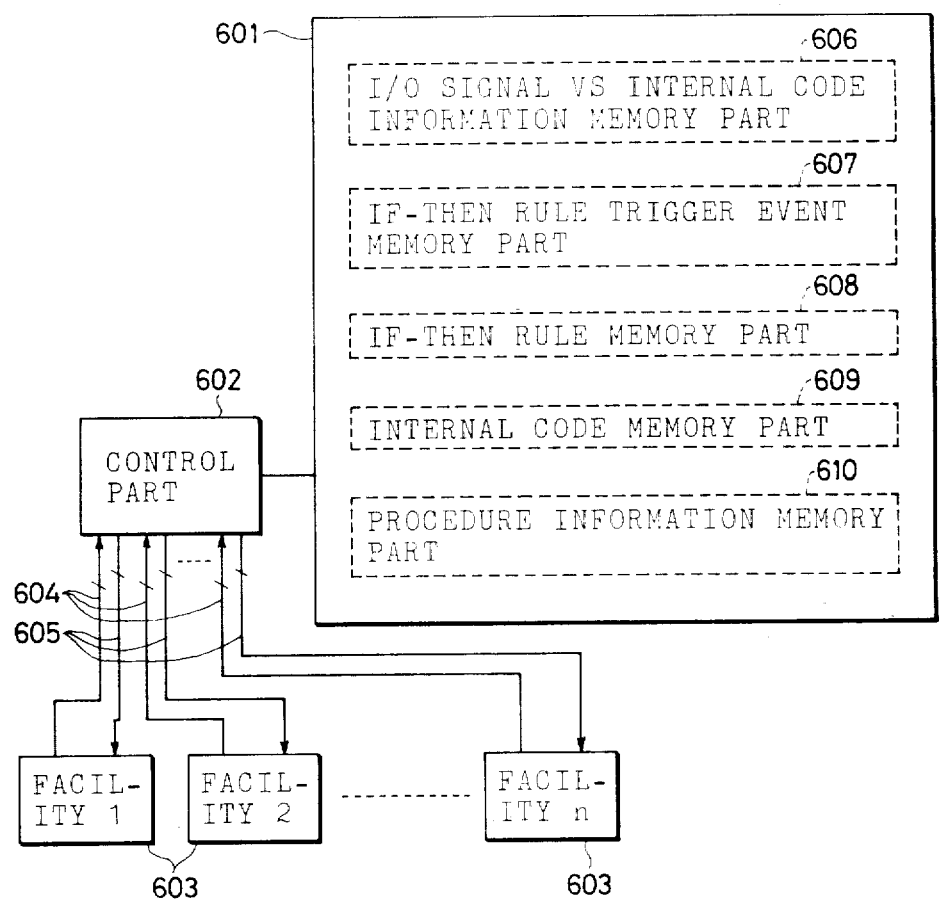
FIG. 6 is a block arrangement diagram of a facilities control apparatus showing an embodiment of the present invention.

FIG. 6 is a block diagram of a facilities control apparatus showing an embodiment of the present invention.

The control apparatus is constructed of a memory part 601, a control part 602, a plurality of facilities 603, status signal lines 604 and command signal lines 605. The memory part 601 has a plurality of information memory parts, namely, the areas of an input/output signal versus internal code information memory part 606, an IF - THEN rule trigger event memory part 607, an IF - THEN rule memory part 608, an internal code memory part 609, and a procedure information memory part 610. The memory part 601 stores the data of IF - THEN rules converted into internal codes, a correspondence table of external signals and internal codes, etc. The control part 602 functions on the basis of information stored in the memory part 601 to receive status signals indicative of the statuses of each of facilities 603 through the signal lines 604, to determine control commands and to send control signals to the respective facilities 603 through the signal lines 605.

FIG. 7 is a diagram for explaining the details of the I/O signal - internal code information memory part 606 in FIG. 6. In FIG. 7, part (a) shows a correspondence table for input signals and the internal codes, while part (b) shows a correspondence table for the internal codes and output signals.

Memory part 606 is a part which stores information for the interface between internal processing and the external signals of the status signal lines 604, the command signal lines 605, etc. shown in FIG. 6.

The input signal - internal code correspondence table 71 shown in part (a) of FIG. 7 is a table which stores information for converting the signals of the status signal lines 604 into internal codes to be handled in the control part 602. The internal codes are the codes explained with reference to FIG. 3.

Table 71 is constructed of a status signal line entry area which stores the entry addresses of the status signal lines 604, a numerical code area which stores internal codes representative facility status corresponding to cases where signals have developed on the signal lines 604, and a parameter part area. On the basis of the data in table 71, control part 602 accesses the respective status signal lines 604 and prepares corresponding internal codes when the signals are generated. The prepared internal codes are stored in the internal code memory part 609. Here, where the signals of the status signal lines 604 are binary information representative of "on" and "off", the control part 602 derives internal codes stored in the table 71, in the form left in tact, whereby the internal codes are deemed to have been prepared. For example, the internal code of address B in part (a) of FIG. 7 indicates such a case. Where the information items of the status signal lines 604 are numerical information, such as read information of bar codes, the internal codes to be prepared are such that the numerical information items are written as values into those parameter parts of the internal codes stored in the table in which are variables (such as W, X, Y and Z). For example, the internal code of address A in part (a) of FIG. 7 indicates such a case. More specifically, in a case where numerical information 34 develops at the status signal line address A, the control part 602 prepares an internal code "1<34>". The internal code "1<34>" indicates, for example, that workpiece number 34 has appeared at the head of a workpiece providing line in an automated factory.

Referring now to part (b) of FIG. 7, the internal code output signal correspondence table 72 is a table which stores information for sending control signals to the facilities 603 through the command signal lines 605 on the basis of internal codes representative of the control commands decided by the control part 602. The internal codes representative of the control command are stored in the internal code memory part 609.

The table 72 contains numerical code area which stores the internal codes representative of the control commands, a parameter part area, and a command signal line entry area which stores the entry addresses of the command signal lines 605 to send the control commands. The control part 602 compares the internal code representative of the determined control command with the internal codes stored in the table 72 and delivers a signal to the command signal lines 605 corresponding to the coincident internal code. In that case, when a variable (such as W, X, Y or Z) is not specified in the parameter part in the internal code stored in the table 72, a binary signal ("on" or "off") is supplied to the corresponding signal line address. As the case of providing the binary signal, there is address D in part (b) of FIG. 7 by way of example. On the other hand, when a variable is specified, the value of the parameter corresponding to the variable in the internal code representative of the determined control command is supplied to the signal line address. For example, when the internal code representative of the determined control command is "9<1><34><1>", signal line address C is supplied with value 34 and 1 in this order. The internal code "9<1><34><1>" signifies, for example, the control command which instructs a carrier 1 in the automated factory to transfer workpiece number 34 to station 1.

FIG. 8 is a detailed explanatory diagram of the IF - THEN rule trigger event memory part 607 in FIG. 6. FIG. 8, part (a) shows a rule set trigger condition table, while in FIG. 8, part (b) shows a storage area for the number of a rule set to be used.

The memory part 607 is a part which stores information for assigning a series of rules to be triggered in response to the generation of signals representative of the statuses of the facilities. Here, "to be triggered" is intended to mean "to be used when the control part 602 determines the control commands". For example, in the control of an automated factory, when a workpiece has appeared at the head of the workpiece providing line, a rule set for assigning the workpiece to a work station is triggered, and a transfer command for a carrier and a job command for the work station are determined.

In addition, when a job has been completed at a work station, a rule set for carrying out (or delivering) a product is triggered, and a fabricated article carry-out command for a carrier is determined. The rule set trigger condition table 81 is a table which stores information for assigning rule sets to be triggered corresponding to the respective status of each of the facilities 603 developed, as explained above. Table 81 contains a status signal line entry area which stores the entry addresses of the status signal lines 604 corresponding to facility statuses to be monitored, and trigger rule set number areas which assign number of rule sets to be triggered in response to signals on signal lines 604. The used rule set number storage area 82 is an area which stores the number of a rule set to be used for the control command decision by the control part 602. The control part 602 polls the respective status signal lines 604 in the basis of the data of the rule set trigger condition table 81. Upon the occurrence of a signal, the trigger rule set number corresponding to the particular signal line 604 is stored in the used rule set number storage area 82, whereupon the process shifts to the next step.

FIG. 9 is a detailed explanatory diagram of the IF - THEN rule memory part 608 in FIG. 6. In FIG. 9, part (a) shows a rule set directory, while part (b) shows a rule table.

The memory part 608 is a part which stores information on the If - THEN rules descriptive of control logic. Since the present invention handles the IF - THEN rules in the form of internal codes, the IF - THEN rule converted into the internal codes are stored in the memory part 608. The rules to be stored are separated into respective rule sets such as a rule set for assigning a workpiece to a work station and a rule set for producing a product.

The rule set directory 91 is constructed of a rule set head position area which assigns the head positions of the respective rule sets on the rule table 92 storing the IF - THEN rules, and a rule set last position area which indicates the last positions thereof. For each rule set, the rules are stored between the head position and the last position. The number of the respective rule sets correspond to the number of the rows of the rule set directory 91.

In the rule table 92, each rule has the IF part and the THEN part divided, and the internal codes thereof are respectively stored in an IF part area and a THEN part area. Each area can store a plurality of internal codes. Further, the IF part area consists of a numerical code area for storing the numerical codes 31 of the internal codes and a parameter part area for storing the parameter parts 32 thereof. The THEN part area includes a numerical code area for storing the numerical codes 31 of the internal codes and a parameter part area for storing the parameter parts 32 thereof and in addition, a procedure name area for storing procedure names in the IF - THEN rules of Form 3. Here, "rule type" is information for distinguishing a rule for finally deciding upon the control command from the other rules, and it is specified in a rule type area. The rule used to finally decide upon the control command is assigned a "1", while the other rules are assinged a "0". The information items are used for determining which conclusion represents the control command to be finally obtained, when the control part 602 successively forms the conclusions (internal codes) of the THEN parts in the process of deciding the control command.

Figure 10:
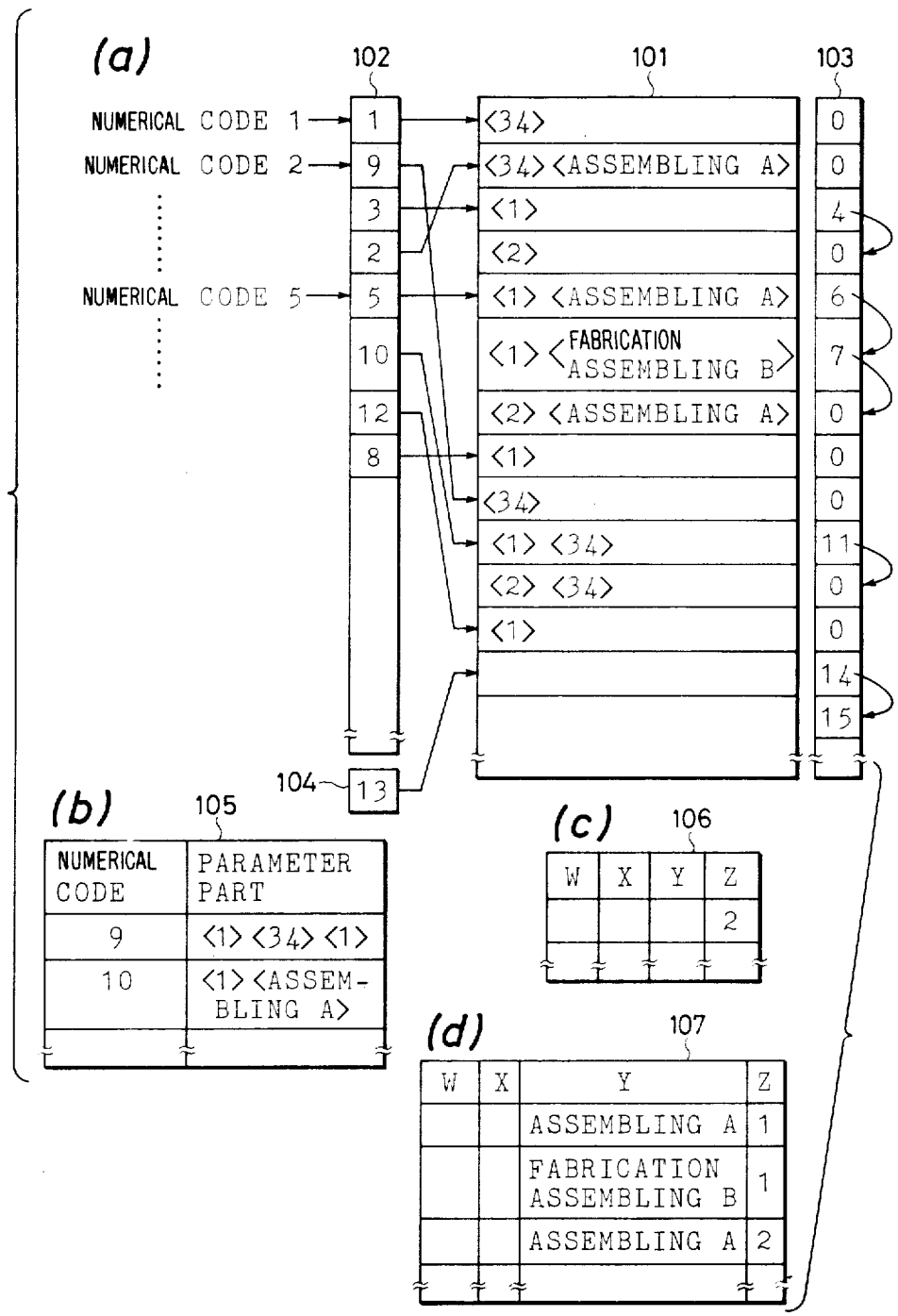
FIG. 10 is a detailed diagram of an internal code memory part.

FIG. 10 is a detailed explanatory diagram of the internal code memory part 609 in FIG. 6. Part (a) of FIG. 10 shows a head pointer table 102, a parameter part storing table 101 and a continuing pointer table 103; part (b) thereof shows a control command storing table 105; part (c) thereof shows a variable value temporary storing table 106; and part (d) shows an AND logic operation satisfaction variable value-storing table 107.

Memory part 609 is a part for storing such information as the conclusions (internal codes) of the THEN parts which are successively formed and the control command (internal code) which is finally determined, when the control command is determined on the basis of the internal codes representative of the status of each of the facilities received and the IF - THEN rules, and the values of variables which are received when the IF - THEN rules of Forms 2 and 3, including the variables, are processed. The parameter part storing table 101, the head pointer table 102 and the continuing pointer table 103 are work tables for storing, by the method shown in FIG. 5A, the conclusions which are sequentially formed during the processing of the internal codes representative of the status of each of the facilities externally received and the IF - THEN rules (among the internal codes appointed in the THEN parts, those except the control command finally determined). The parameter part storing table 101 is a table which stores the parameter parts 32 of the respective internal codes. The continuing pointer table 103 is a table which stores continuing pointers 52 that successively coupled rows storing the parameter parts 32 of the internal codes having the same numerical codes 31. The rows of the continuing pointer table 103, corresponding to those of the parameter part storing table 101, store the positions of those rows of the parameter part storing table 101 in which additional parameter parts 32 of the same numerical code are stored. The last of the continuing parameter parts 32 is indicated by storing zero in the continuing pointer table 103. In addition, the head pointer table 102 is a table which stores the head pointers 51. The head pointer 51 indicates the head of the parameter parts 32 of the internal codes having the same numerical codes 31 as coupled by the continuing pointers 52 in table 103. The rows of the head pointer table 102 correspond to the respective numerical codes 31. That is, numerical code 1 is at the first row, numerical code 2 is at the second row, and numerical code 3 is at the third row. The position of the head row of one series of parameter parts 32 having the same numerical codes 31 as stored in the parameter part storing table 101 is stored in the head pointer table 102. The head row (row 13 as shown in FIG. 10) of the empty areas of the parameter part storing table 101 is stored in an empty area head pointer area 104, all the empty areas are coupled by pointers, and the pointer information is stored in the continuing pointer table 103, so as to manage empty area positions.

The control command storing table 105 shown in part (b) of FIG. 10 is a table which stores the internal codes representative of the control commands finally determined by the control part 602. Table 105 consists of a numerical code area which stores the numerical codes of the internal codes of the determined control commands, and a parameter part area which stores the parameter parts thereof. The variable value temporary storage table 106 in part (c) of FIG. 10 and the AND logic satisfied variable value storage table 107 in part (d) thereof serve to process the IF - THEN rules of Forms 2 and 3. When a determination has been made of the coincidence between any desired internal code specified in the IF part of a rule and the internal codes stored in the work tables (head pointer table 102, parameter part storage table 101, continuing pointer table 103), the variable value temporary storage table 106 stores the parameter value of the parameter part 32 of that one of the internal codes stored in the work tables which coincides with the internal code specified in the IF part of the rule, the aforementioned parameter value being received as the value of the corresponding variable of the parameter part 32 of the internal code of the IF part of the rule. Whether or not any of the internal codes stored in the work tables coincides with the internal code specified in the IF part of the rule is determined by the use of the numerical code 31 of the internal code and the parameter part 32 thereof except parameters specifying variables. The AND logic satisfaction variable value storage table 107 is a table which stores those received variable values satisfying the AND logic operation of the IF part.

Figure 11:
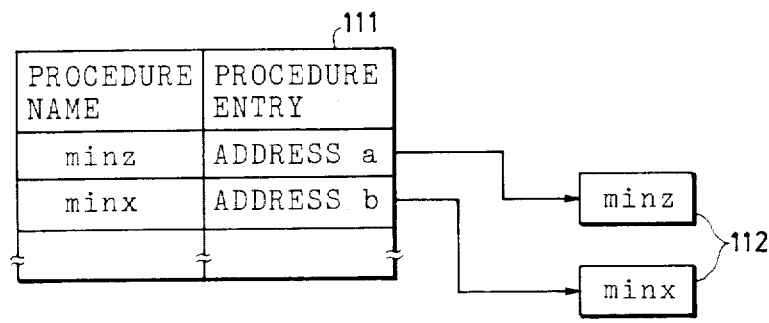
FIG. 11 is a detailed diagram of a procedure information memory part.

FIG. 11 is a detailed explanatory diagram of the procedure memory part 610 in FIG. 6.

This memory part 610 is a part for storing the contents and entry addresses of procedures which are designated in the IF - THEN rules of Form 3. A procedure entry table 111 consists of a procedure name area which stores procedure names, and a procedure entry area which stores the entry addresses of the procedures. The respective procedures 112 are stored in entry address positions designated in the procedure entry table 111.

Figure 12:
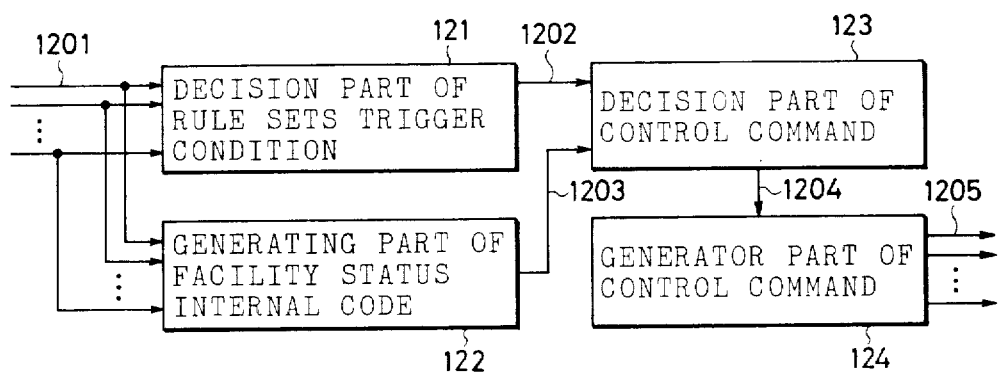
FIG. 12 is a functional block diagram of a control part.

FIG. 12 is a functional block diagram of the control part 602 in FIG. 6.

The control part 602 contains a rule set trigger condition decision part 121, a facility status internal code generating part 122, a control command deciding part 123, and a control command signal generating part 124. In the flow of information, numeral 1201 represents a status signal, numeral 1202 rule set number, numeral 1203 the internal code of a facility status, numeral 1204 the internal code of a control command, and numeral 1205 a command signal.

FIG. 13 is an operating flow chart of the control part 602.

The operations of the control part 602 will now be described in accordance with the flow chart of FIG. 13, reference being had to the arrangement of FIGS. 7 to 12.

When the control part 602 has started operating, polling of the status signal lines 604 is first initiated by the rule set trigger condition part 121. That is, the rule set trigger condition decision part 121 successively scans the signal lines of the status signal line entries stored in the rule set trigger condition table 81, to determine if a signal has been generated or not (step 131). If no signal is generated, scanning of the successive signal lines 604 is cyclically continued. If a signal has been generated for a status signal line, a trigger rule set number 1202 specified in the rule set trigger condition table 81, in correspondence with the particular signal line 604, is set in the area 82 for storing the number of a rule set to be used, and the facility status internal code generating part 122 is enabled (step 132). The facility status internal code generating part 122 first clears the head pointer table 102 to zero and sets the value of the empty area head pointer area 104 at "1". That is, the head pointer is set at the first location or top of the parameter part storage table 101. Further, the continuing pointer table 103 is set so that all the rows of the parameter part storage table may be coupled from the first row by the continuing pointers. In other words, a state is established in which no internal code information is stored in the work tables (head pointer table 102, parameter part storage table 101, continuing pointer table 103). Subsequently, the signal lines of the status signal line entries stored in the input signal - internal code correspondence table 71 are successively accessed; an internal code (numerical code and parameter part) is generated for a signal line generating a signal, the internal code being specified in correspondence with the particular signal line in the input signal - internal code correspondence table 71 (refer to FIG. 7); the internal code is stored in the work tables; and the control command deciding part 123 is enabled (step 133). Here, storage of the generated internal code in the work tables is executed as follows. First, the pointer of the row of the head pointer table 102 corresponding to the numerical code 31 of the generated internal code is scanned, and whether or not the parameter part coincident with that 32 of the generated internal code is stored in the parameter part storage table 101 is checked by scanning through the pointers of the continuing pointer table 103. If the parameter part already exists, no action is taken. When it does not exist, that row of the parameter part storage table 101 to which the last of the scanned pointer points (the continuing pointer previously being at zero) is coupled to the row of the head of the empty areas. That is, the value of the empty area head pointer area 104 is set in that row of the continuing pointer table 103 which corresponds to the particular row. Next, the parameter part 32 of the generated internal code is stored in the row at the head of the empty areas, and the particular row is rendered the last row. In other words, a zero is set in that row of the continuing pointer table 103 which corresponds to the particular row. In addition, the empty area head pointer area 104 is set at the row of the next empty area. The control command deciding part 123 determines an internal code representative of a control command by a process to be described later and stores it in the control command storage table 105, whereupon the control command signal generating part 124 is enabled (step 134). Unless the status of each of the facilities satisfies the condition of the control logic operation described by the IF - THEN rule, nothing is stored in the control command storage table 105. The control command signal generating part 124 first checks whether or not the internal code of the control command is stored in the control command storage table 105.

When nothing is stored, the rule set trigger condition decision part 121 is enabled without any other processing, to start the polling again (step 131). When a control command internal code is stored, it is compared with the internal code stored in the internal code - output signal correspondence table 72, and a signal is generated for the signal line of the corresponding command signal line entry of the coincident row (refer to FIG. 7). After the above signal generation has been performed for all the internal codes stored in the control command storage table 105, the rule set trigger condition decision part 121 is enabled (step 135), and the polling is restarted (step 131).

Figure 14:
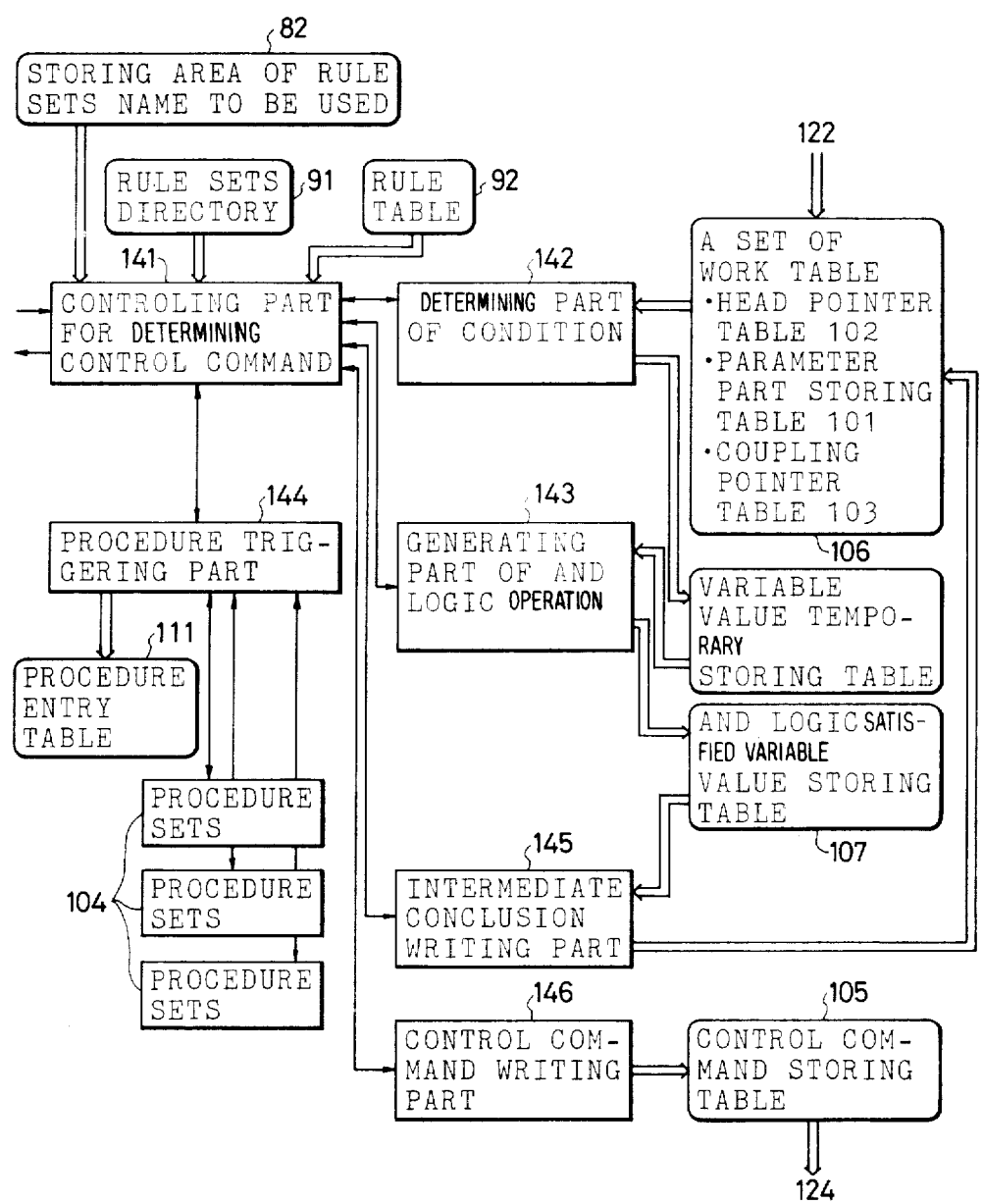
FIG. 14 is a diagram showing the relationships among the functional blocks of a control command deciding part and various tables.

FIG. 14 is a diagram which shows the relationships of functional blocks and tables within the control command deciding part 123 in FIG. 12.

In FIG. 14, solid lines indicate the control flow and thick lines the flow of information. The control command deciding part 123 consists of a control part 141 for determining a control command, a condition decision part 142, a part 143 for generating an AND logic function, an intermediate conclusion writing part 145, and a control command writing part 146.

Figure 15D:
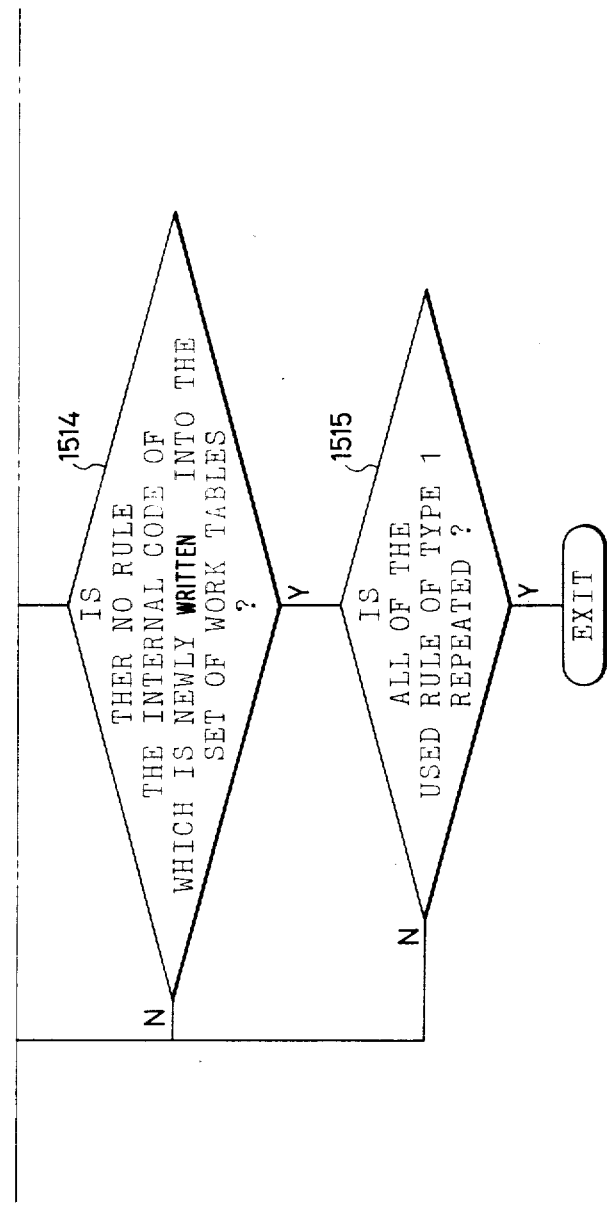

An operating flow chart of the control command decision part 123 in FIG. 14 is shown in FIGS. 15A-15D to be arranged in sequence in the manner shown in FIG. 15.

When the control command decision part 123 has been enabled, control is first delivered to the control command decision controlling part 141. Using the other functional blocks, the control command decision controlling part 141 determines the control command as explained below. The control command decision controlling part 141 first clears the control command storing table 105 (step 151) and on the basis of rule set number stored in the used rule set number storing area 82, it obtains from the rule set directory 91 the head and last positions in the rule table 92 for the rule to be used (step 152). Subsequent processing is executed for only the rule between the head and last positions.

Until any new rule no longer requires supplementing of the internal code of the THEN part in the work tables, the control command decision controlling part 141 repeats the following processing steps for each of the rules of rule type O in the rule table 92 (step 1514). When there is no new rule requiring a supplement, the following processing step is further repeated for each of the rules of type 1 in the rule table 92 (step 1515), whereupon the control command signal generating part 124 is enabled. The control command decision controlling part 141 extracts a prescribed rule, and processes each internal code specified in the IF part of the rule. The condition decision part 142 is first extracted, and it determines coincidence between one of the internal codes of the IF part of a prescribed rule and an internal code stored in the set of the work tables (step 153). The condition decision part 142 first scans the pointer of the row of the head pointer table 102 corresponding to the numerical code 31 of the internal code of the IF part and then scans the pointers of the continuing pointer table 103 in succession until the continuing pointer value becomes zero. Thus, it checks whether or not the parameter part coincident with the parameter part 32 of the internal code of the IF part is stored in the parameter part storing table 101. A determination of coincidence is effected by the use of the parameter part 32 of the internal code of the IF part except the parameter parts specifying variables. In case of coincidence, the value of the parameter of the parameter part in the parameter part storage table 101 corresponding to the parameter specifying the variable is stored in the variable value temporary storage table 106 as the value of the variable specified in the IF part. In this case, each time the parameter part coincident with that 32 of the internal code of the IF part is found in the parameter part storage table 101, the variable value is stored, and such parameter parts are successively stored in the respective rows of the variable value temporary storage table 106. Where no variable is specified in the parameter of the parameter part 32 of the internal code of the IF part (Rule 1), no variable value is especially stored. When, as the result of the above, there is no parameter part coincidence, the control command decision controlling part 141 extracts the next rule and begins the condition decision again (step 154). Where there is coincidence of parameter parts, if the parameter part 32 of the internal code of the IF part having now been determined to be coincident includes a parameter specifying a variable, the AND logic operation generating part 143 is accessed and generates a combination of variable values satisfying the AND logic operation of the IF part in conformity with a process to be described later (step 156). The result of the combination is stored in the AND logic meeting variable value-storing table 107. At this time, when there is no combination of the variable values satisfying the AND logic operation, the control command decision controlling part 141 discards the rule being processed, and it extracts the next rule, so as to begin the condition determination again (step 157). If the parameter part 32 of the internal code of the IF part having now been coincidence evaluated includes no parameter specifying a variable, the above processing step is not executed (step 155). After the control command decision controlling part 141 has performed the processing step thus far described for all internal codes specified in the IF part of the rule, it shifts to the next processing step (step 158). First, the control command decision controlling part 141 extracts one internal code of the THEN part of the rule being now processed. Where a procedure name is specified for the internal code in the rule table 92, the control command decision controlling part 141 enables a procedure triggering part 144 so as to trigger a designated procedure (step 1510). When no procedure name is designated, the procedure triggering part 144 is not called (step 159). The procedure triggering part 144 searches the entry address of the procedure name specified for the internal code, from the procedure entry table 111, and enables the procedure of the address with the AND logic satisfaction variable value-storing table 107 as a minuend. Within the procedure, the value of the AND logic satisfaction variable value-storing table 107 can be altered at will. Subsequently, the control command decision controlling part 141 examines the type of rule being processed (rule type in the rule table 92). In case of type 0, the intermediate conclusion writing part 145 is accessed, and the extracted internal code of the THEN part of the rule being processed is stored in the set of the work tables (step 1511). In case of type 1, the control command writing part 146 is accessed, and the extracted internal code of the THEN part of the rule being processed is stored in the control command storing table 105 (step 1512). The control command decision controlling part 141 repeats the processing operation thus far described for all the internal codes specified in the THEN part (step 1513). Where the parameter part 32 in the internal code intended to be stored includes a parameter specifying a variable, the intermediate conclusion writing part 145 creates an internal code in which the content of the parameter is replaced with the corresponding variable value of a certain row stored in the AND logic selection variable value-storing table 107. On the other hand, where the parameter part 32 includes no parameter specifying a variable, the internal code intended to be stored is used, as is. Subsequently, the intermediate conclusion writing part 145 stores the created internal code in the set of the work tables. Storage is done by the same method as in the foregoing case where the internal code generated by the facility status internal code generating part 122 is stored in the set of the work tables. At this time, as in the foregoing method, when the internal code intended to be stored is already stored in the work tables, it is not stored anew. The above processing step is repeated for all the rows of the AND logic meeting variable value-storing table 107 in which variable values are stored. As in the intermediate conclusion writing part 145, the control command writing part 146 first creates an internal code to be written. Subsequently, it stores the internal code in the control command storing table 105 successively from the head location thereof. In this case, if the internal code to be stored already exists in the control command storing table 105, it is not rewritten. As in the case of the intermediate conclusion writing part 145, the above processing step is repeated for all the rows of the AND logic satisfaction variable value-storing table 107 in which the variable values are stored.

Figure 16:
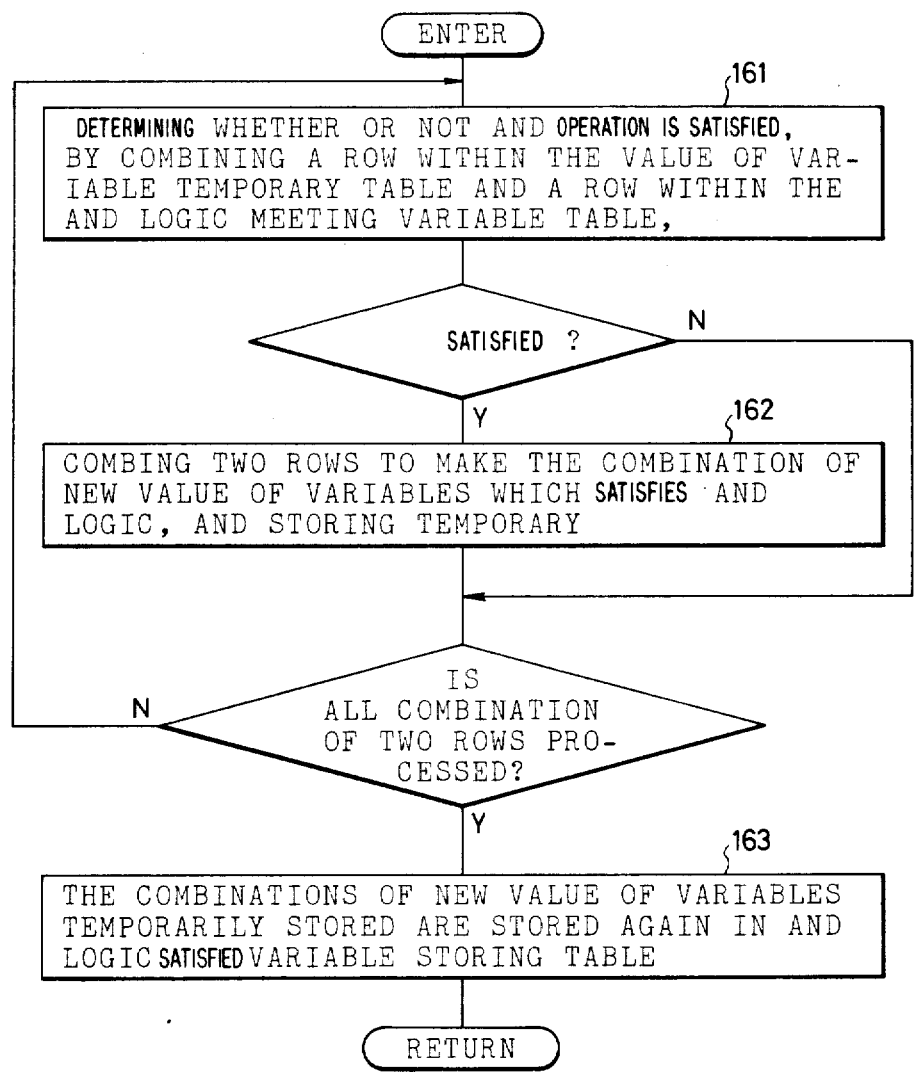
FIG. 16 is an operating flow chart of an AND logic combination generating part.

FIG. 16 is an operating flow chart of the AND logic combination generating part 143 in FIG. 14.

The AND logic combination generating part 143 combines the combination (stored in the variable value temporary storage table 106) of the values of the variables received when the coincidence between the certain internal code of the IF part and the internal code stored in the work table has been newly determined and the combination (stored in the AND logic satisfaction variable value-storing table 107) of the values of the variables meeting the AND logic in the internal codes of the IF parts which have been determined to be coincident, in order to prepare anew the combination of the values of variables satisfying AND logic operations when the internal codes subjected to the coincidence judgements comparisons are also included (the prepared combination is stored in the AND logic satisfaction variable value-storing table 107 again). More specifically, as shown in FIG. 16, whether or not AND logic condition is satisfied is determined for all the combinations between the rows of the variable value temporary storage table 106 and the rows of the AND logic meeting variable value-storing table 107 (step 161). When the AND logic condition is satisfied, the combination of variable values satisfying the AND logic operation is created anew and is temporarily stored (step 162). Lastly, the new combination of the variable values stored temporarily is stored in the AND logic satisfied variable value-storing table 107 again (step 163). Here, the case where the AND logic operation is satisfied is a case where, on the side of the variable value temporary storage table 106 and the side of the AND logic satisfied variable value-storing table 107, the variables of the same variable name have a coincident value, or either of the variables has no value (that is, the table location is blank). The combination of the variable values also satisfying the new AND logic is created in such a way that, in one combination satisfying the AND logic operation between the row of the variable value temporary storage table 106 and the row of the AND logic meeting variable value-storing table 107, the variables having a coincident variable value are set at the coincident value, while as to the variables either of which is blank, the blank variable is changed into the value of the variable having this value.

Figure 17:
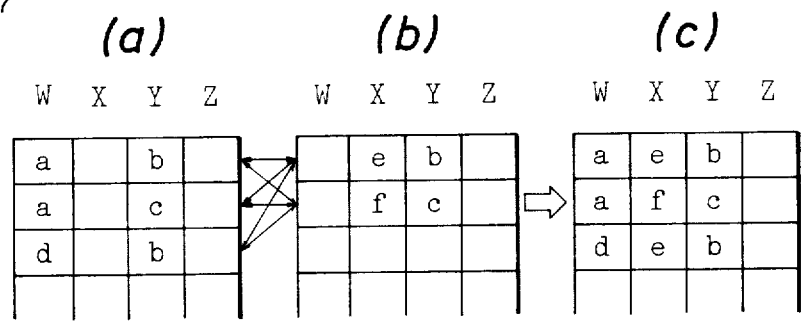
FIG. 17 is a diagram showing examples of combinations of variables meeting AND logic which are created in the AND logic combination generating part.

FIG. 17 is a diagram showing an example of the combination of variables satisfying AND logic. Part (a) in FIG. 17 shows a variable value temporary storage table, and parts (b) and (c) in FIG. 17 show AND logic satisfying variable value-storing tables.

In this example, the variable values (W=a, X=blank, Y=b, Z=blank) of the first row of the variable value temporary storage table and the variable values W=blank, X=e, Y=b, Z=blank) of the first row of the AND logic satisfied variable value-storing table satisfying an AND logic operation, so that the combination of the variable values satisfying the AND logic, W=a, X=e, Y=b, and Z=blank, is created in the first row of the AND logic satisfaction variable value-storing table anew.

In this way, according to the present embodiment, various control logic operations can be simply described using IF - THEN rules, and information converted into internal codes is merely stored in the respective tables of the memory part 601, whereby condition discriminative controls of the various control logic functions can be easily performed. Further, alterations of the contents of the condition discriminative controls responsive to a change of a controlled system, the change of a control system, etc. can be readily handled by altering the IF - THEN rules. Further, the present embodiment can shorten the period of time required for pattern matching of character strings and useless checking period attendant upon work table searches. In addition, by employing the rule set trigger condition table 81, it is possible to observe only those statuses of facilities that require rule triggering, and the useless polling of signal lines can be reduced. For these reasons, the processing time from the occurrence of a certain facility status until the decision of a control command and the generation of a signal representative thereof is shortened as compared with that in the prior art, and the invention is applicable even to the control of a controlled system of which a quick response time is required. The operation of the control command deciding part 123 in the present embodiment was simulated. As a result, the processing rate was enhanced 20 times or more over the prior art, and a decision execution time of several tens - hundred/msec realized.

In the present embodiment, instead of polling the status signal lines by means of the control part 602, an external interrupt may well be used as the triggering of a series of operations of the control part 602. In this case, the control system of the present invention can be realized in such a way that an interrupt factor is assigned to each facility status which is the condition of rule triggering and that number of a rule set to be triggered is designated for each factor. In addition, when interrupt levels for the interrupt factors are specified in the rule set directory 91, priority levels can be given to the decisions of control commands. Moreover, when some rows of the head pointer table 102 are set so that the facility status internal code generating part 122 is not cleared to zero at the beginning of the control command decision, some internal codes can be fixedly stored in the set of work tables beforehand. This dispenses with the labor and time for receiving fixed conditions in the facilities from the signal lines on each occasion, so that the processing rate can be enhanced.

As described above, according to the present invention, the character strings of IF - THEN rules and character strings to be stored in a work table are handled in the form of codes. In addition, when storing the coded information in the work table, the storage positions of information associated with the character strings of the same kind are coupled by pointers. Therefore, checks of the information in the work table in the cases of determining the condition of an IF part and writing the conclusion of a THEN part may be performed in only necessary places, which shortens the time required for the pattern matching of the character strings and reduces the useless checks of the information in the work table, so that the processing speed can be sharply enchanced over the prior art. Accordingly, a specialist for developing a program is unnecessary even for the condition discriminative control of a controlled system requiring short response time, and a control technician can readily perform a desired condition discriminative control by describing a control system with IF - THEN rules by himself/herself.

We claim:
1. A control system having a controller for controlling the operation of a plurality of facilities in real time, and memory, coupled to said controller, for storing information in accordance with which said controller controls the operation of said facilities, wherein said memory comprises
first memory means for storing facility status signals representative of the statuses of the facilities, command signals responsive to said status signals and information representative of correspondence between said status signals, said command signals and internal codes,
second memory means for storing information for specifying a series of rules to be triggered in accordance with the statuses of the facilities,
third memory means for storing rules converted into said internal codes, and
fourth memory means for storing internal codes of conclusions sequentially formed in accordance with the operation of control commands for corresponding facilities on the basis of the internal codes representative of the statuses of the facilities and internal codes representative of rules, and finally determined internal codes, and wherein said controller comprises
settling means for monitoring the facility status signals and controlling the generation of said facility status signals, and the number of rule-set for use on the basis of the information stored in said second memory means, internal code generating means for generating internal codes corresponding to said generated facility status signals on the basis of the information stored in said first memory means, determining means for reading out corresponding rules from said third memory means on the basis of said number of the rule set having been determined by said settling means and for determining a final control command in accordance with information stored in said fourth memory means, and command signal generating means for generating a command signal for a facility in accordance with an internal code for a determined control command on the basis of the information stored in said first memory means.

2. A control system according to claim 1, wherein said fourth memory means comprises a first table for storing parameter parts of internal codes representative of occurred statuses of facilities, and parameter parts of internal codes of conclusions formed according to the rules, a second table for storing continuing pointers for coupling, within said first table, parameter parts of the aforementioned internal codes having the same fixed parts, and a third table for storing head pointers for indicting the heads of series of parameter parts coupled by continuing pointers for the respective same fixed parts.

* * * * *